United States Patent
Khosravani et al.

(10) Patent No.: US 6,542,650 B2
(45) Date of Patent: Apr. 1, 2003

(54) POLARIZATION-MODE DISPERSION EMULATOR

(75) Inventors: Reza Khosravani, Fremont, CA (US); Paniz Ebrahimi, Los Angeles, CA (US); Ivan T. Lima, Jr., Arbutus, MD (US); Edem Ibragimov, Ellicott City, MD (US); Alan E. Willner, Los Angeles, CA (US); Curtis R. Menyuk, Silver Spring, MD (US)

(73) Assignees: University of Southern California, Los Angeles, CA (US); University of Maryland Baltimore County, Baltimore, MD (US)

( * ) Notice: Subject to any disclaimer, the term of this patent is extended or adjusted under 35 U.S.C. 154(b) by 0 days.

(21) Appl. No.: 09/727,820

(22) Filed: Nov. 30, 2000

(65) Prior Publication Data

US 2001/0024538 A1 Sep. 27, 2001

Related U.S. Application Data

(60) Provisional application No. 60/168,205, filed on Nov. 30, 1999, and provisional application No. 60/172,346, filed on Dec. 16, 1999.

(51) Int. Cl.$^7$ .................................................. G02B 6/00
(52) U.S. Cl. ............................ 385/11; 385/28; 385/27; 385/123; 359/161; 359/156
(58) Field of Search ............................... 385/11, 24, 27, 385/28, 123; 359/140, 156, 161, 122

(56) References Cited

U.S. PATENT DOCUMENTS

| 4,389,090 | A | | 6/1983 | LeFevre |
| 5,111,322 | A | * | 5/1992 | Bergano et al. ............. 359/122 |
| 5,473,457 | A | | 12/1995 | Ono |
| 5,611,005 | A | * | 3/1997 | Heismann et al. ............. 385/1 |
| 5,930,414 | A | | 7/1999 | Fishman et al. |

* cited by examiner

*Primary Examiner*—Robert H. Kim
*Assistant Examiner*—George Wang
(74) *Attorney, Agent, or Firm*—Fish & Richardson P.C.

(57) ABSTRACT

Techniques and devices for emulating polarization-mode dispersion in an optical signal that transmits through an optical fiber by using multiple birefringent wave-guiding sections that are interconnected to have adjustable polarization-changing connectors. The polarization of light transmitting from one section to another adjacent section can be modified differently between different adjacent sections according to a distribution function to produce one PMD state to represent one possible PMD state of a real PMD fiber. The connectors can be adjusted to produce different sets of polarization modifications to produce different PMD states to represent different possible PMD states of the real PMD fiber.

25 Claims, 7 Drawing Sheets

POLARIZATION-MODE DISPERSION EMULATOR

This application claims the benefits of U.S. Provisional Application No. 60/168,205, filed Nov. 30, 1999, and No. 60/172,346, filed Dec. 16, 1999.

TECHNICAL FIELD

This application relates to polarization-mode dispersion in optical fibers, and more specifically, to techniques and systems for emulating polarization-mode dispersion in optical fibers.

BACKGROUND

Some optical transmission media such as optical fibers may be birefringent to exhibit different refractive indices for light of different polarizations. Typical causes for such birefringence in certain fibers include, among others, imperfect circular core and unbalanced stress in a fiber along different transverse directions. The axis of birefringence of the optical fiber change randomly on a time scale that varies between milliseconds and hours, depending on the external conditions. Optical fibers with such birefringence, which evolves randomly along the fiber, are said to exhibit polarization-mode dispersion ("PMD"). Therefore, an optical signal, that comprises of two components along the two orthogonal principal polarization states for each frequency, can be significantly distorted after propagation through the transmission medium. The amount of PMD may be characterized by the average differential group delay ("DGD") between two principal states of polarization.

This polarization-mode dispersion is undesirable because the pulse broadening can limit the transmission bit rate, the transmission bandwidth, and other performance factors of an optical communication system. In fact, PMD is one of key limitations to the performance of some high-speed optical fiber communication systems at or above 10 Gbits/s due to the fiber birefringence. Fibers with significant PMD (e.g., about 1 to 10 ps/km$^{1/2}$) are used in various fiber networks, particularly in those that were deployed in 1980's and early 1990's. Hence, it is desirable to characterize various effects of PMD in fiber systems, including high-speed transmission that uses those PMD fibers.

One difficulty to characterize effects of PMD in fiber systems is that high PMD fibers that are already used in many fiber systems are no longer commercially available. Hence, PMD emulating devices have been developed and used to emulate actual PMD in a fiber system. Such PMD emulator may be used during testing and design phases of high-performance fiber systems, allowing for rapid and convenient exploration of a large number of different realizations of instantaneous DGDs of a fiber with PMD. For example, a PMD compensator may be designed by using the PMD emulating device to test its PMD compensating capability.

The DGD in an actual PMD fiber, however, is not a fixed value but is a random variable that has a Maxwellian probability density function. See, e.g., Gisin et al., "Experimental Investigations of the Statistical Properties of Polarization Mode Dispersion in Single Mode Fibers," IEEE Photonics Tech. Letters, Vol. 5, No.7, pp.819–821, July 1993. One difficulty in designing a PMD emulator is to produce a probability density function for the DGD values that substantially resembles a Maxwellian probability density function for any wavelength within a desired spectral range.

SUMMARY

One embodiment of a PMD emulator of this disclosure includes a plurality of birefringent wave-guiding sections to transmit light and a plurality of variable polarization-changing connectors to connect the wave-guiding sections. The wave-guiding sections are configured to respectively produce different relative delays between two orthogonal principal polarizations. Polarization-mode dispersion in an actual fiber can be emulated by transmitting a beam through the wave-guiding sections and the connectors.

Each connector is coupled between two adjacent sections to transmit light and is operable to variably modify a polarization of light. Different connectors can be adjusted to produce different modifications in the polarization of light. The number of the sections, the different relative delays in the sections, and different polarization modifications between different adjacent sections are selected to produce a substantially Maxwellian probability density function for different total delay values between two orthogonal principal polarizations.

The connectors can be adjusted to produce different sets of polarization modifications so that the Maxwellian probability density function can be emulated for any fixed frequency at different wavelengths with a desired spectral range, e.g., the ITU wavelengths for WDM systems.

DETAILED DESCRIPTION

Figure 1:
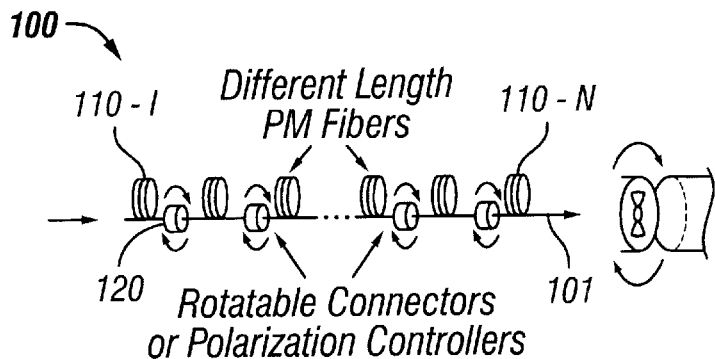
FIG. 1 shows one embodiment of a PMD emulator with multiple birefringent wave-guiding sections that are connected in series by variable polarization-changing connectors.

FIG. 1 shows a PMD emulator 100 according to one embodiment of the present disclosure. Multiple birefringent wave-guiding sections 110-1, 110-2, . . . , 110-N are connected in series along an optic axis 101 by (N−1) variable polarization-changing connectors 120. Each section is birefringent and hence can cause a DGD in an optical signal that transmits therethrough.

The wave-guiding sections may be implemented in various configurations, such as polarization-maintaining ("PM") fibers, waveguides formed of birefringent materials over substrates, and anisotropic crystal materials. Different waveguiding sections are generally designed to produce different DGD values that vary according to a selected DGD distribution pattern. For example, the varying DGD values from the sections may be deviated from a predetermined averaged DGD value from about 20% to about 25%. The varying DGD values from different sections may be achieved by using, for example, PM fiber sections of the same birefringence but different lengths, PM fiber sections of different birefringence with the same length, or a combination of both.

Hence, an optical wave, after propagating along the optic axis 101 through sections 110-1 through 110-N, acquires a total DGD accumulative of varying DGD values from individual sections 110-1 through 110-N. This total DGD, however, is not a simple sum of the different DGD values from different sections due to the operations of the variable polarization-changing connectors 120. One aspect of the PMD emulator 100 is to combine the varying DGD values from the different sections and variable polarization-changing connectors to emulate the actual PMD profile of a real fiber.

Each variable polarization-changing connector 120 is designed to modify the polarization state of the optical signal exiting one section and to couple the modified optical signal into another adjacent section. The modification by the connector 120 may include a phase shift between two orthogonal principal polarizations, a change in the relative amplitude of the two polarizations, or a combination of a phase shift and a change in the relative amplitude or any change in the polarization state of the light. Notably, the amount of modification to the polarization state is adjustable in response to an external control, either manually or automatically.

The variable connectors 120 are generally adjusted to produce different polarization modifications from one another according to a selected distribution profile. For example, the different polarization modifications may be random with respect to one another. In one implementation where the each connector 120 is designed to rotate the polarization of the signal beam, the angular offsets produced by different connectors 120 may be random numbers with a uniform probability for angles between 0 and $\pi$. One ensemble of settings of the connectors 120 is used to emulate one particular possible PMD state of a real PMD fiber. The connectors 120 can be adjusted to achieve different realizations of settings so that different possible PMD states of the real PMD fiber are emulated. The emulator 100 is designed in a way that the DGD values obtained from different realizations of connector settings to substantially resemble a Maxwellian probability density function. The average DGD value over these different DGD values should approximately equal to or close to the average DGD value of that real PMD fiber.

The polarization-changing connectors 120 may be implemented in different configurations. For example, polarization controllers may be used as the connectors 120. As another example, rotatable fiber connectors may also be used to change the angular offset between the axes of principal polarizations of two adjacent sections while maintaining the relative phase of the principal polarizations. In addition, the birefringent wave-guiding sections may be rotated with respect to another to cause a change in the polarization of light when exiting one section and entering another adjacent section.

It is desirable to design the device parameters of the PMD emulator 100 to emulate various characteristics of the PMD in the actual PMD fiber. For example, the PMD in the actual PMD fiber has a probability density function for the DGD values that is substantially Maxwellian for an optical signal at each and every wavelength of multiple wavelengths within a desired spectral range (e.g., the ITU WDM wavelengths). For another example, the probability density function produced from the emulator 100 should also be substantially Maxwellian for any given set of random angular offsets between adjacent sections for different optical signals at different wavelengths within the desired spectral range.

Furthermore, the PMD characteristics of different optical signals at different wavelengths with sufficiently large frequency spacing should also be statistically independent. Karlsson and Bretel, "Autocorrelation Function of the Polarization-Mode Dispersion Vector," Optics Letters, Vol. 24, No. 14, pp.939–941, July 1999. Hence, the PMD vectors for such sufficiently-spaced wavelengths should be uncorrelated with respect to one another.

It is discovered that, the adjustable mechanism for producing variable angular offsets between adjacent sections of the PMD emulator 100, in combination of properly selected number of sections, N, and different DGD values for different sections, can be used to achieve the above desirable characteristics.

Figure 2A:
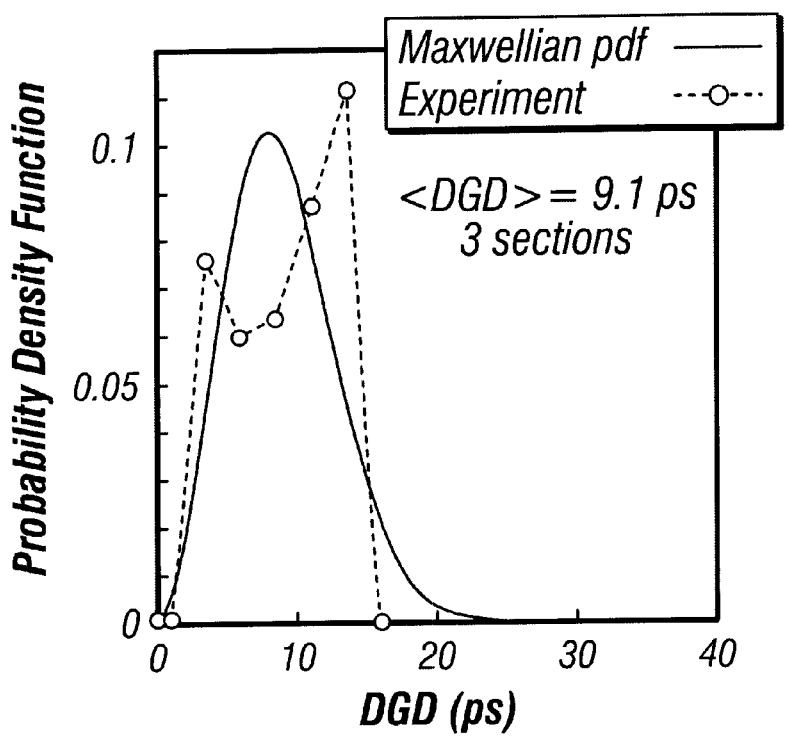
FIGS. 2A and 2B show probability density functions for differential group delay values for multi-section PMD emulators with fixed angular offsets between adjacent sections, wherein different group delay values are obtained by scanning the wavelength of light over different wavelengths.
Figure 2B:
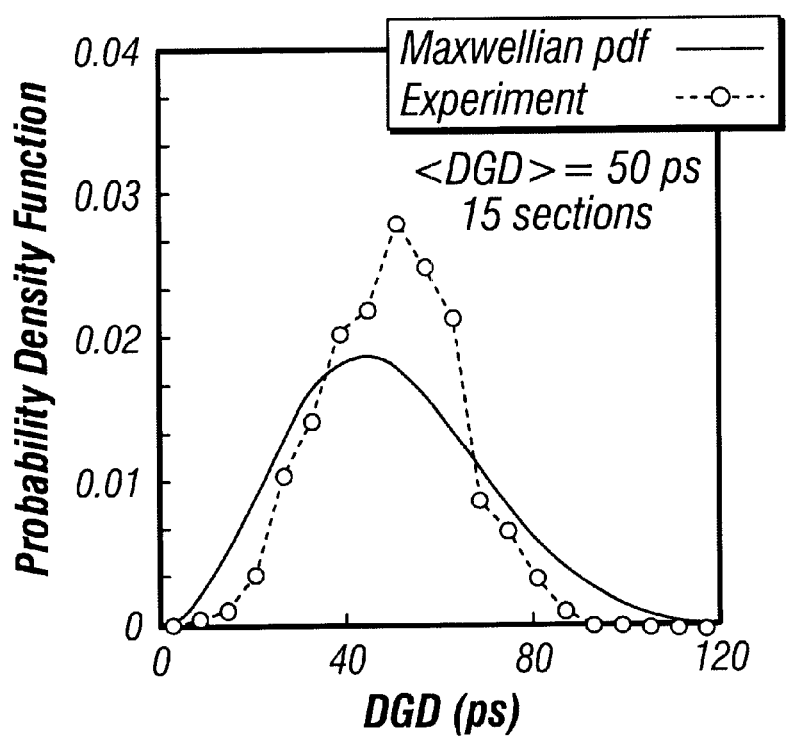

FIGS. 2A, 2B, 3A, 3B, and 3C compare the computed results with the measured results from two different PMD emulators formed of different PM fiber sections, one with rotatable connectors between adjacent PM fiber sections and another with fixed angular offsets between adjacent PM fiber sections. The results from the PMD emulator with fixed angular offsets are shown in FIGS. 2A and 2B for N=3 and N=15, respectively. Since the angular offsets are fixed, different PMD values can be achieved by sweeping the wavelength of the input optical signal to the emulator around 1555 nm over a spectral range of about 20 nm. The measured DGD values indicate that the DGD probability density functions are generally not Maxwellian. Notably, the measured average DGD for the fixed-angle 15-section emulator is about 50 ps, significantly deviated from the intended average value of 40 ps by about 25%.

Figure 3A:
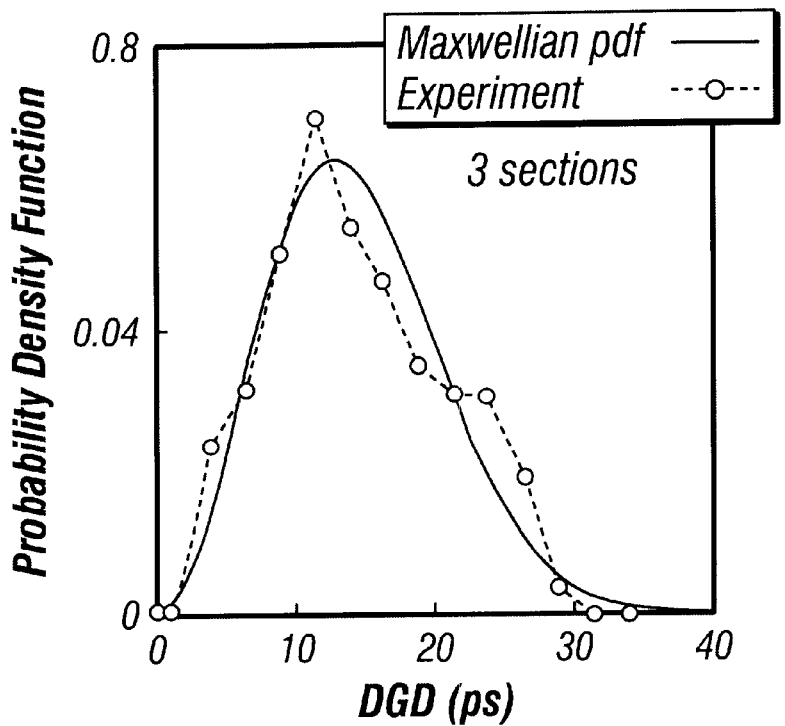
FIGS. 3A, 3B, and 3C show probability density functions for differential group delay values for multi-section PMD emulators that use rotatable fiber connectors to produce adjustable angular offsets between adjacent sections.

A multi-section emulator with adjustable angular offsets, in comparison, may be designed to provide significant improvement in emulating the PMD in actual fibers. The angular offsets are selected randomly with an equal probability between the values 0 and $\pi$. FIG. 3A shows the measured DGD probability density function for a rotatable 3-section emulator according to the design in FIG. 1. Different DGD values are measured at a fixed input optical wavelength near 1555 nm by adjusting two rotatable-key FC connectors to achieve different sets of random angular offsets. Compared to the results in FIG. 2A, the measured probability density function in FIG. 3A is closer to the Maxwellian function but still deviates significantly from the Maxwellian function due to the few number of sections.

Figure 3B:
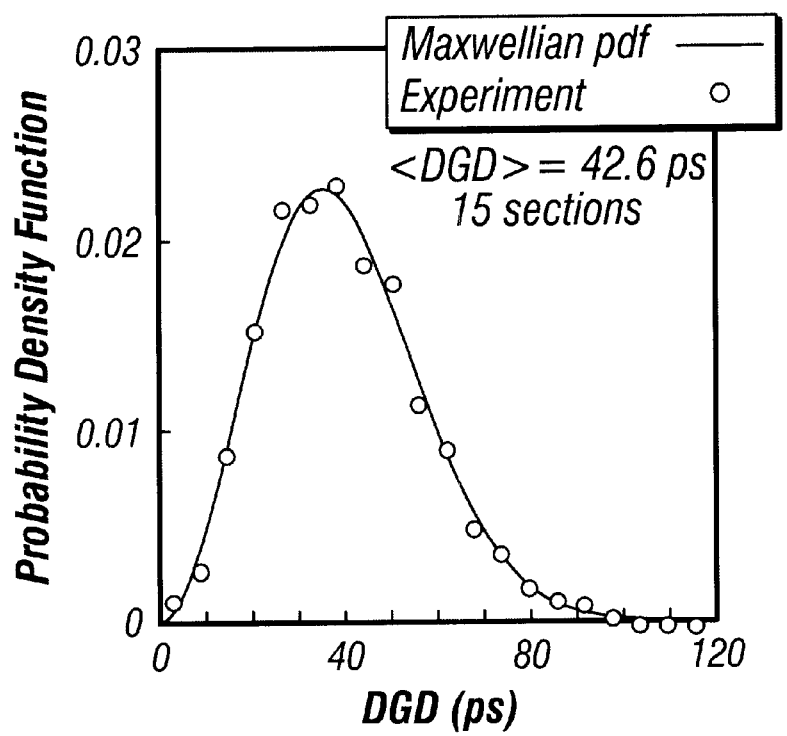
Figure 3C:
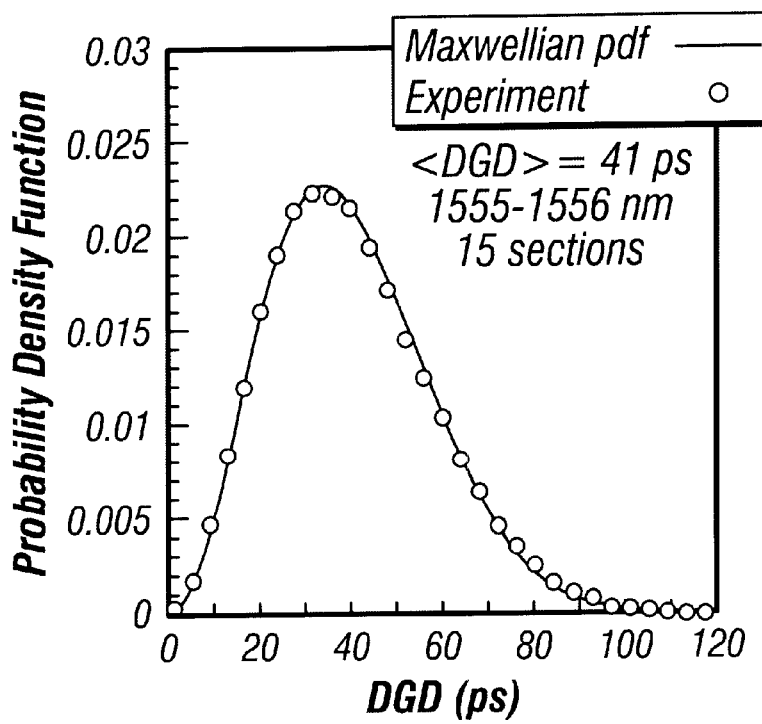

FIG. 3B shows the results from a rotatable 15-section emulator obtained from different sets of random angular offsets between adjacent sections at a single wavelength of about 1555 nm. Compared to FIG. 3A, the measured probability density function in FIG. 3B substantially matches the Maxwellian function with an average DGD at about 42.6 ps, deviated from the targeted average value of 40 ps by less than 7%. Similar match is obtained at other different wavelengths. FIG. 3C shows the Maxwellian-matched results obtained at a fixed set of random angular offsets over 50 different wavelengths spaced by 0.02 nm and located between 1555 nm and 1556 nm.

Figure 3D:
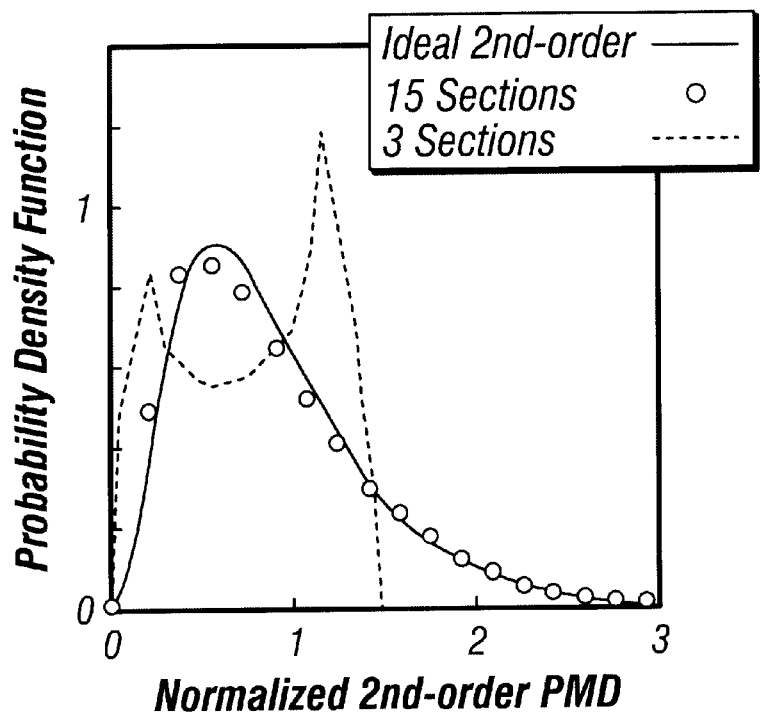
FIG. 3D further shows computed second-order PMD probability density functions for a 15-section and a 3-section emulators with rotatable fiber connectors.

FIG. 3D further shows computed second-order PMD probability density functions for a 15-section and a 3-section emulators with adjustable connectors 120. The simulation indicates that, the emulator 100 in FIG. 1 is in good agreement with the ideal distribution for the second order PMD. See, e.g., Ciprut et al., "Second-Order Polarization Mode Dispersion: Impact on Analog and Digital Transmissions," IEEE J. Lightwave Technol., Vol. 16, No. 5, pp. 757–771, May 1998. Hence, the adjustable connectors 120 not only can be used to emulate the first order PMD characteristic represented by the DGD values but also can emulate the second-order PMD in a real PMD fiber.

To design the emulator 100 for emulating the correct DGD autocorrelation function at multiple wavelengths within a spectral range, e.g., ITU wavelengths near 1550 nm for WDM systems, the lengths of the birefringent sections may be configured to vary from an average length by about 20% to about 25%. The length variation of the sections may be uniformly distributed or have other distribution profiles. To optimize the convergence of the DGD distribution function to match the Maxwellian distribution density function at a selected optical wavelength, the variation of the length of each section after deducting the multiples of the beat length should not be equal and should be distributed between 0 and the beat length. The beat length in a birefringent waveguide is defined as a length along the fiber over which the light propagation causes a phase change of $2\pi$ between the two orthogonal principal states of polarization at that wavelength. For example, the PM fiber sections for the above 15-section emulators under measurement have the same birefringence but with different lengths. The lengths of the sections are randomly selected around an average of about 7 meters and a deviation of 20% from 7 meters according to a Gaussian distribution profile, e.g., 5.1, 6.8, 8.6, 7.4, 6.3, 6.7, 10.0, 8.6, 5.4, 7.2, 6.9, 7.1, 6.1, 7.4, and 4.6 meters. The beat length of the PM fiber is about 2.9 mm at 1550 nm. The total of 15 such unequal sections are used to produce an averaged PMD of about 40 ps. The polarization dependent loss is measured to be less than 0.2 dB and the total optical loss is between about 6 dB and 10 dB, depending on the angular offsets.

Figure 3E:
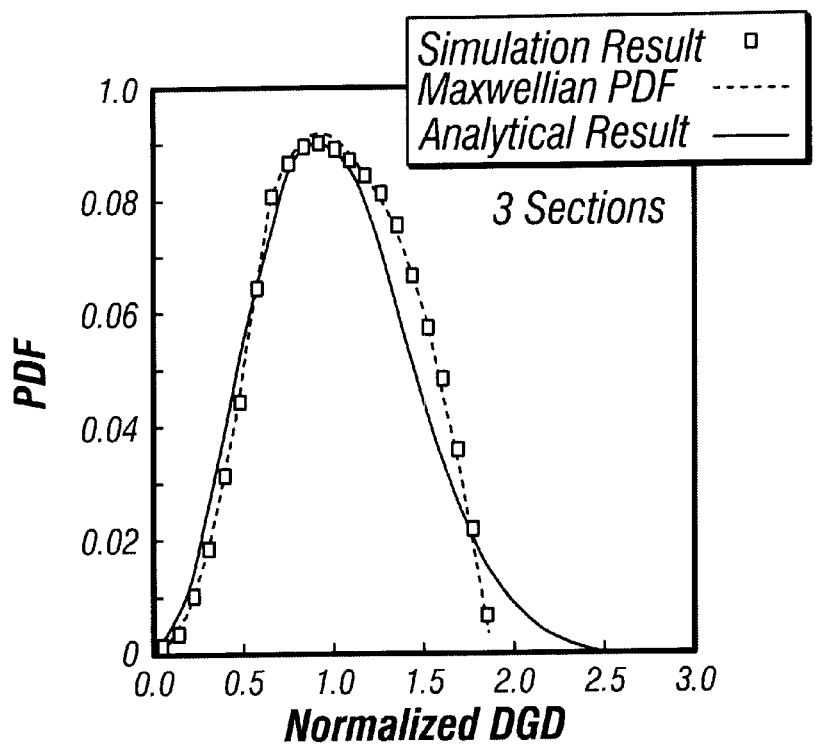
FIGS. 3E and 3F show PMD probability density functions for 3-section and 4-section emulators that use polarization controllers as the polarization-changing connectors.
Figure 3F:
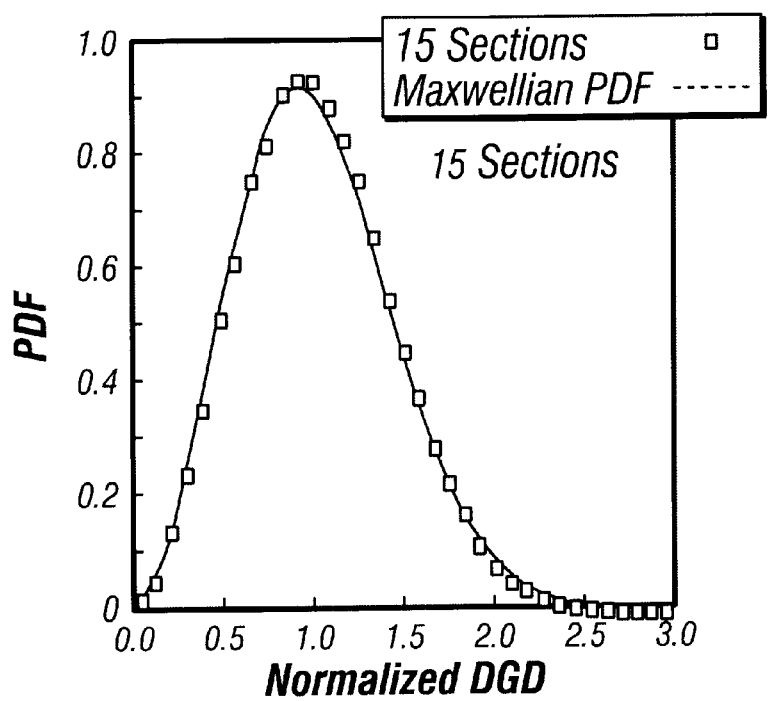

The performance of the 3-section and 15-section emulators shown in FIGS. 3A through 3C can be improved by substituting the rotatable connectors by the polarization controllers. This is because a polarization controller can operate to change the polarization vectors in any position on the Poincare sphere to better "scramble" the polarization light at an intersection between two adjacent birefringent sections. FIGS. 3D and 3E show the PMD distribution functions for such 3-section and 15-section emulators, respectively. Compared to results in FIGS. 3A and 3B, respectively, the convergence to the Maxiwellian distribution is improved.

Figure 4A:
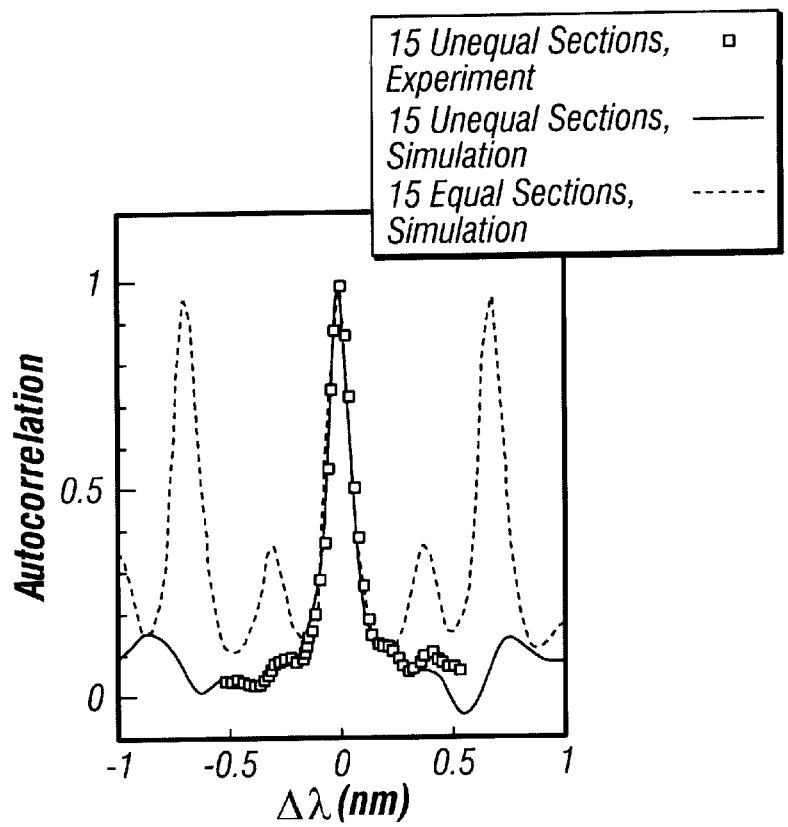
FIGS. 4A and 4B show PMD autocorrelation functions for different multi-section PMD emulators.

FIG. 4A shows the autocorrelation functions of the 15-section emulators with unequal sections and equal sections. Both emulators use rotatable connectors to connect different PM fiber sections. The frequency spacing for decorrelation of the PMD vectors for two different wavelengths is inversely proportional to the PMD value of an actual fiber. The simulated autocorrelation function 410 of the 15-section emulator of equal section is a periodic function of the frequency spacing and the residual correlation is relatively large (about 37%). When the sections are unequal in length (i.e., unequal DGD values), both simulated autocorrelation function 420 and the measured result 430 show that the periodicity is essentially removed and the residual correlation is less than 10%. Hence, unequal DGD values for different PM fiber sections are generally preferred in designing a multi-section emulator.

Figure 4B:
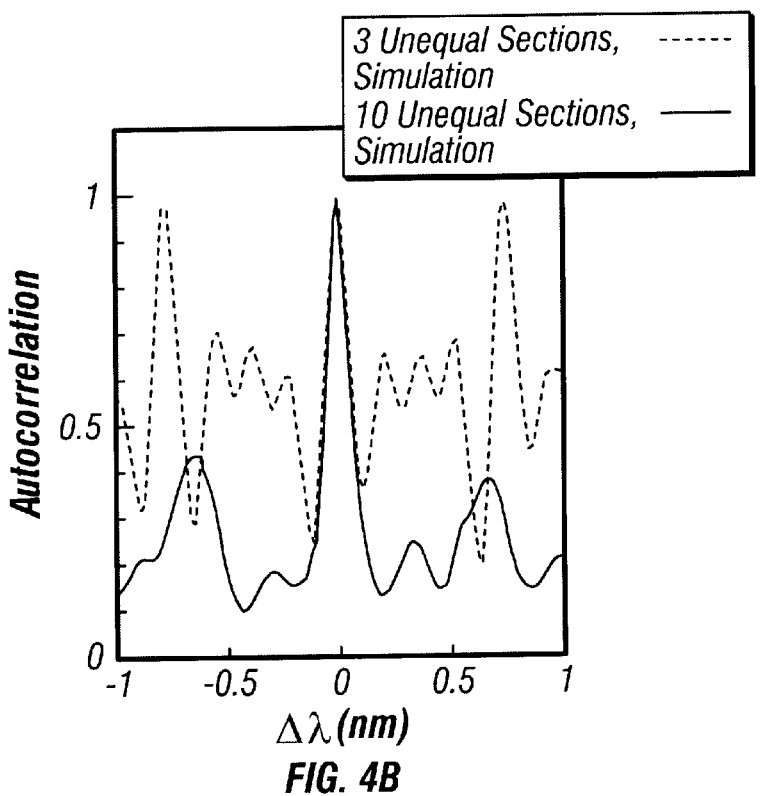

In comparison, FIG. 4B shows the simulated autocorrelation functions of rotatable 3-section and 10-section emulators with unequal sections. The results suggest that a large number of sections, N, is desirable to reduce the residual correlation.

In the above exemplary PMD emulators, each PM fiber section is uniform in its birefringence and has substantially fixed axes of principal polarizations within each section. The axes of principal polarizations change their directions locally at the interconnections, i.e., the polarization-changing connectors, between adjacent sections. As already described, the number of sections, N, can be increased to improve the emulation performance of the emulator.

Alternatively, it is contemplated that each birefringent waveguide section may be designed to have a composite structure with two or more birefringent segments in which the axes of principal polarizations of two adjacent segments may be connected relative to one another by a fixed angle. FIG. 5, for example, shows a PMD emulator 500 with of 10 unequal composite sections 510. Each composite section includes two PM fibers 510a and 510b that are spliced with their orientations of birefringence misaligned by $\pi/4$. The composite structure can effectively improve the performance of the emulator. In one implementation, the polarization-changing connectors 120 may be polarization controllers which can control its output polarization regardless of the polarization of light at its input terminal.

Figure 5A:
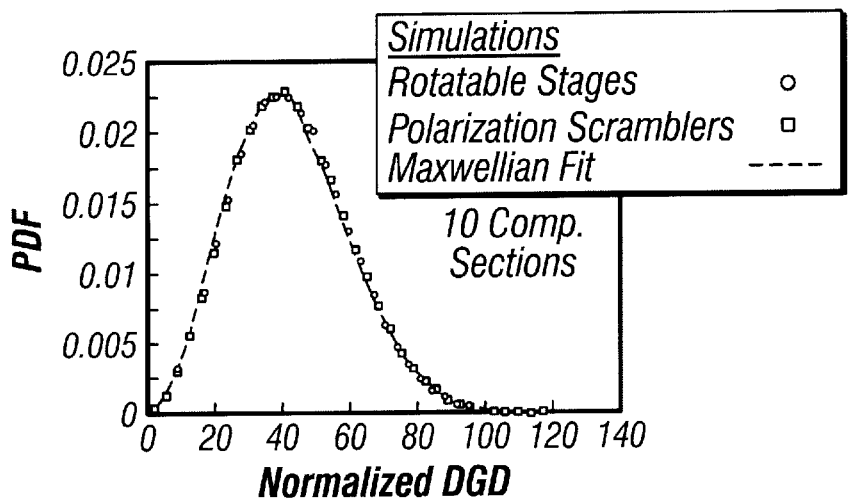
FIG. 5A shows the probability density functions for differential group delay values for the PMD emulator in FIG. 5.
Figure 5B:
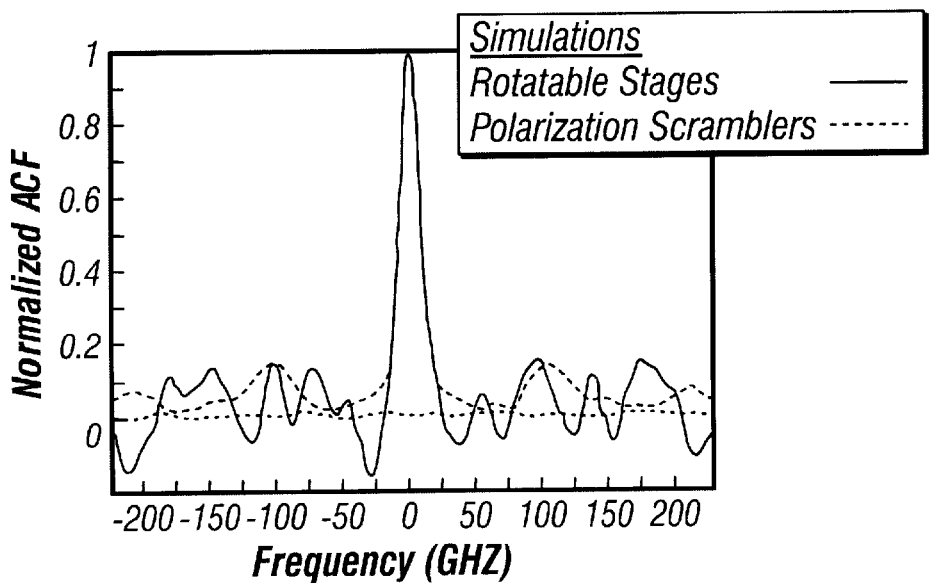
FIG. 5B shows the PMD autocorrelation functions of two PMD emulators based on the design shown in FIG. 5.
Figure 5:
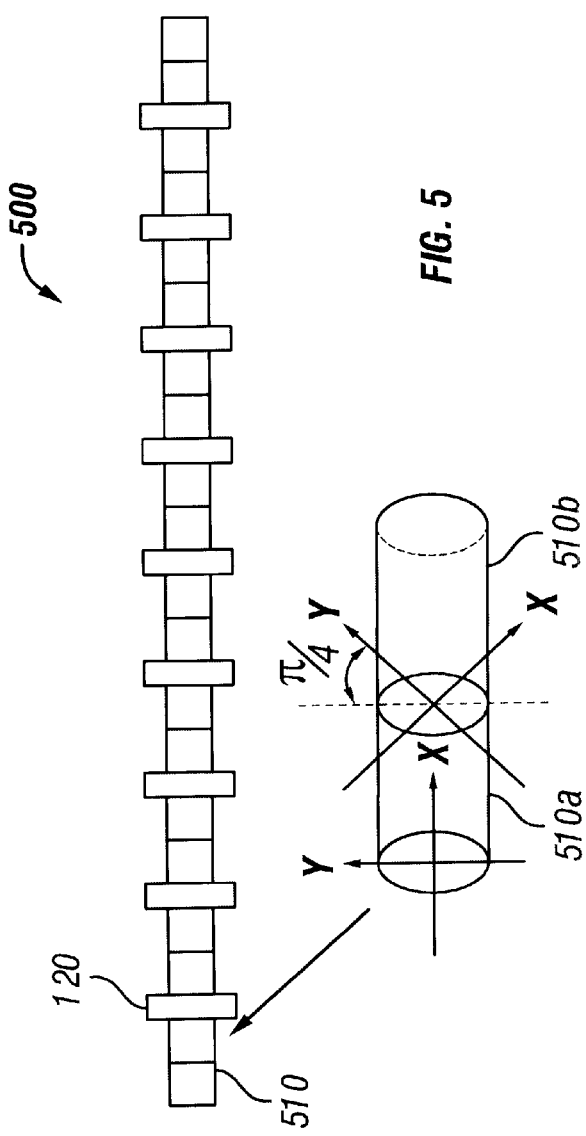
FIG. 5 shows one embodiment of a PMD emulator with adjustable composite birefringent sections.

FIG. 5A shows the simulated PMD distribution density functions at a single optical wavelength of 1550 nm for the PMD emulators with 10 unequal composite sections that are interconnected with rotatable connectors and polarization scramblers, respectively. A polarization scrambler here is meant as a polarization controller. It can control its output polarization regardless of the polarization of light at its input terminal. The average DGD of the emulators is about 41.9 ps. FIG. 5B shows the respective autocorrelation functions for both emulators with a residual correlation less than 10%.

Figure 6:
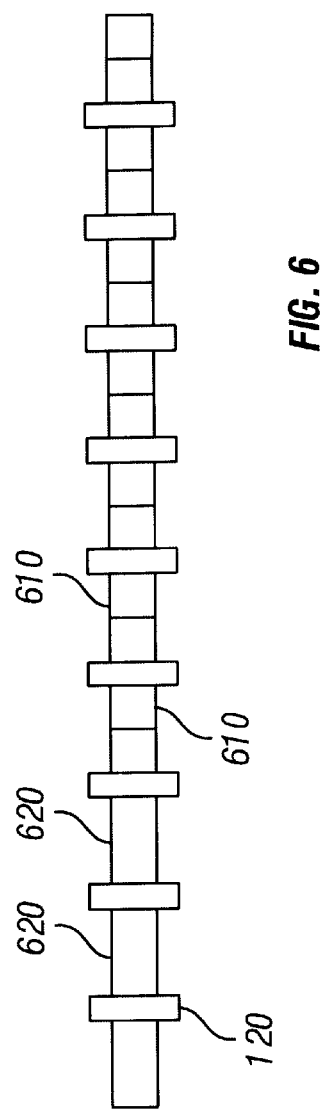
FIG. 6 shows another embodiment of a PMD emulator with adjustable birefringent sections with birefringent with both composite and non-composite structures.

FIG. 6 shows another exemplary PMD emulator 600 with multiple birefringent sections interconnected by variable polarization-changing connectors 120. At least one composite section 610 and one uniform section 620 are included.

Although the present disclose only includes a few examples, it is understood that various modifications and enhancements may be made without departing from the following claims.

What is claimed is:
1. An optical fiber device, comprising:
  a plurality of birefringent wave-guiding sections positioned in series along an optical path to transmit light and to respectively produce different relative delays between two orthogonal principal polarizations, said sections designed to have different lengths varying from an averaged section length less than a beat length that causes a phase change of $2\pi$ between said two orthogonal principal polarizations; and
  a plurality of variable polarization-changing connectors, each coupled between two adjacent sections to transmit light between said two adjacent sections and operable to variably modify a polarization of light transmitting from one section to another adjacent section, different connectors adjusted to produce different modifications in the polarization of light, where in a number of said sections, said different relative delays in said sections, and different polarization modifications between different adjacent sections are selected to produce a substantially Maxwellian probability density function for different total delay values between two orthogonal principal polarizations.

2. The device as in claim 1, wherein said connectors are operable to set angular offsets between different adjacent sections at random values.

3. The device as in claim 2, wherein said random values have a uniform probability to be any values between 0 and $\pi$.

4. The device as in claim 1, wherein said sections have substantially the same birefringence per unit length but with different lengths.

5. The device in claim 1, wherein said sections have different birefringence per unit length.

6. The device as in claim 1, wherein said different relative delays between two principal polarizations for said sections are deviated from an average value from about 20% to about 25%.

7. The device as in claim 1, wherein each connector is operable to rotate two input principal states of polarizations of the respective birefringent section.

8. The device as in claim 1, wherein said probability density function is obtained for different sets of random angular offsets for light at a single wavelength.

9. The device as in claim 1, wherein said probability density function is obtained for a given set of random angular offsets for light at different wavelengths within a spectral range.

10. The device as in claim 1, wherein values of different lengths of said wave-guiding sections are selected to reduce a correlation between instantaneous DGD values for two different wavelengths with a frequency difference greater than a predetermined value.

11. The device as in claim 1, wherein a section in said plurality of sections includes at least a first birefringent segment and a second birefringent segment with their axes of principal polarizations misaligned.

12. The device as in claim 1, wherein each connector is formed of a polarization controller.

13. The device as in claim 1, wherein each connector is operable to change a phase between two orthogonal principal states of polarization.

14. The device as in claim 1, wherein each connector is operable to change a relative amplitude between two orthogonal principal states of polarization.

15. The device as in claim 1, wherein each connector is operable to change a relative amplitude and a phase between two orthogonal principal states of polarization.

16. The device as in claim 1, wherein each section is formed from a polarization maintaining fiber.

17. The device as in claim 1, wherein each section is formed from an anisotropic crystal material.

18. A method, comprising:
providing a plurality of birefringent wave-guiding sections positioned in series along an optical path to produce polarization-mode dispersion (PMD) in light that transmits along said optical path, wherein said sections are operable to respectively produce different relative delays between two orthogonal principal polarizations and are designed to have different lengths varying from an averaged section length less than a beat length that causes a phase change of $2\pi$ between said two orthogonal principal polarizations;

using a plurality of variable polarization-changing connectors to optically couple said sections along said optical path, wherein each connector is operable to variably modify a polarization of light transmitting from one section to another adjacent section;

adjusting the connectors to produce different modifications in the polarization of light between different adjacent sections according to a selected distribution pattern; and selecting a number of said sections, said different relative delays in said sections, and different polarization modifications between different adjacent sections to produce a substantially Maxwellian probability density function for different total delay values between two orthogonal principal polarizations.

19. The method as in claim 18, wherein the selected distribution pattern is a random pattern.

20. The method as in claim 19, wherein said connectors are operable to rotate the polarization of light at random values which have a uniform probability to be any values between 0 and $\pi$.

21. A method, comprising:
providing a plurality of birefringent wave-guiding sections positioned in series along an optical path to produce polarization-mode dispersion (PMD) in light that transmits along said optical path, wherein said sections are operable to respectively produce different relative delays between two orthogonal principal polarizations and are designed to have different lengths varying from an averaged section length less than a beat length that causes a phase change of $2\pi$ between said two orthogonal principal polarizations;

modifying a polarization of light transmitting from one section to another adjacent section so that the polarization of light is modified differently between different adjacent sections according to a distribution function to produce one PMD state to represent one possible PMD state of a real PMD fiber;

producing different sets of polarization modifications to produce a plurality of different PMD states to represent different possible PMD states of the real PMD fiber; and selecting a number of said sections, said different relative delays in said sections, and said distribution function to produce a substantially Maxwellian probability density function for different total delay values between two orthogonal principal polarizations.

22. The method as in claim 21, wherein said distribution function is a random distribution.

23. The method as in claim 22, wherein the polarization of light is rotated at random values between different adjacent sections, said random values having a uniform probability to be any values between 0 and $\pi$.

24. The method as in claim 21, wherein said different relative delays by said different sections vary according to a Gaussian distribution function.

25. The method as in claim 21, further comprising selecting values of different lengths of said wave-guiding sections to reduce a correlation between instantaneous DGD values for two different wavelengths with a frequency difference greater than a predetermined value.

* * * * *

UNITED STATES PATENT AND TRADEMARK OFFICE
CERTIFICATE OF CORRECTION

| | |
|---|---|
| PATENT NO. | : 6,542,650 B2 |
| APPLICATION NO. | : 09/727820 |
| DATED | : April 1, 2003 |
| INVENTOR(S) | : Reza Khosravani et al. |

It is certified that error appears in the above-identified patent and that said Letters Patent is hereby corrected as shown below:

Column 1, line 7, insert the following paragraph:

-- FEDERALLY SPONSORED RESEARCH OR DEVELOPMENT
This invention was made with government support under Contract No. 5523214 awarded by the National Science Foundation, Contract No. F30602-98-1-0196 awarded by the Air Force Research Laboratory and Contract No. 05525044 awarded by the Department of Energy. The government has certain rights in the invention. --

Signed and Sealed this

Seventeenth Day of February, 2009

JOHN DOLL
*Acting Director of the United States Patent and Trademark Office*